United States Patent
Khaled et al.

(10) Patent No.: US 9,599,005 B2
(45) Date of Patent: Mar. 21, 2017

(54) SYSTEMS AND METHODS FOR ON-BOARD DIAGNOSTICS OF A PARTICULATE MATTER FILTER

(71) Applicant: Cummins Inc., Columbus, IN (US)

(72) Inventors: Nassim Khaled, Columbus, IN (US); Richard A. Booth, Columbus, IN (US)

(73) Assignee: Cummins Inc., Columbus, IN (US)

( * ) Notice: Subject to any disclaimer, the term of this patent is extended or adjusted under 35 U.S.C. 154(b) by 679 days.

(21) Appl. No.: 14/042,960

(22) Filed: Oct. 1, 2013

(65) Prior Publication Data

US 2015/0092809 A1    Apr. 2, 2015

(51) Int. Cl.

| | |
|---|---|
| *G01K 13/02* | (2006.01) |
| *G01M 15/00* | (2006.01) |
| *F01N 11/00* | (2006.01) |
| *F01N 3/021* | (2006.01) |
| *F01N 3/035* | (2006.01) |

(52) U.S. Cl.
CPC ............ *F01N 11/002* (2013.01); *F01N 3/021* (2013.01); *F01N 3/035* (2013.01); *F01N 2550/04* (2013.01); *F01N 2560/06* (2013.01); *F01N 2560/14* (2013.01); *F01N 2900/0412* (2013.01); *F01N 2900/1602* (2013.01); *Y02T 10/47* (2013.01)

(58) Field of Classification Search
CPC combination set(s) only.
See application file for complete search history.

(56) References Cited

U.S. PATENT DOCUMENTS

| | | |
|---|---|---|
| 5,896,743 A | 4/1999 | Griffin |
| 5,938,715 A | 8/1999 | Zhang et al. |
| 6,292,406 B1 | 9/2001 | Le et al. |
| 6,408,616 B1 | 6/2002 | Mazur et al. |
| 6,601,382 B2 | 8/2003 | Nader et al. |
| 6,964,194 B2 | 11/2005 | Busch et al. |
| 7,343,786 B2 | 3/2008 | Pfister |
| 7,766,542 B2 | 8/2010 | Cunningham |
| 7,824,460 B2 | 11/2010 | Schramm et al. |
| 7,891,177 B2 * | 2/2011 | Ammineni .......... F02D 41/0235 60/297 |
| 8,020,372 B2 * | 9/2011 | Mullins ................. F01N 3/0231 60/274 |
| 8,029,592 B2 | 10/2011 | Schramm et al. |
| 8,048,185 B2 | 11/2011 | Baldwin, Jr. et al. |
| 8,240,138 B2 | 8/2012 | Lu et al. |
| 8,245,567 B2 | 8/2012 | Wang et al. |
| 2009/0133387 A1 * | 5/2009 | Nishizawa ............ F02D 41/029 60/286 |
| 2011/0000193 A1 | 1/2011 | Paterson et al. |
| 2011/0036071 A1 | 2/2011 | Arnold et al. |
| 2011/0047985 A1 * | 3/2011 | Zawacki ............. F02D 41/1494 60/286 |
| 2011/0061367 A1 | 3/2011 | Laermann et al. |
| 2013/0177482 A1 * | 7/2013 | Ikawa ................ B01D 53/9495 422/109 |

* cited by examiner

*Primary Examiner* — Lisa Caputo
*Assistant Examiner* — Nasir U Ahmed
(74) *Attorney, Agent, or Firm* — Taft Stettinius & Hollister LLP

(57) ABSTRACT

An apparatus, system, and method are provided for determining a health value of a catalyzed diesel particulate filter using a midbed temperature of the catalyzed diesel particulate filter and a reference temperature.

19 Claims, 3 Drawing Sheets

SYSTEMS AND METHODS FOR ON-BOARD DIAGNOSTICS OF A PARTICULATE MATTER FILTER

TECHNICAL FIELD

The present disclosure generally relates to internal combustion engines, and more particularly, but not exclusively, to on-board diagnostics of non-methane hydrocarbon conversion efficiency.

BACKGROUND

Available techniques for particulate filter diagnostics suffer from a number of disadvantages, drawbacks, and inadequacies including an inability to adequately diagnose particulate filter loading and loss of filtration efficiency among others. There are significant unmet needs for improved exhaust emissions solutions including improvements to particulate filter diagnostics.

SUMMARY

One embodiment of the present application includes a unique structure to diagnose the efficiency of a diesel particulate filter ("DPF"). Other embodiments include apparatuses, systems, devices, hardware, methods, and combinations for such diagnostics. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
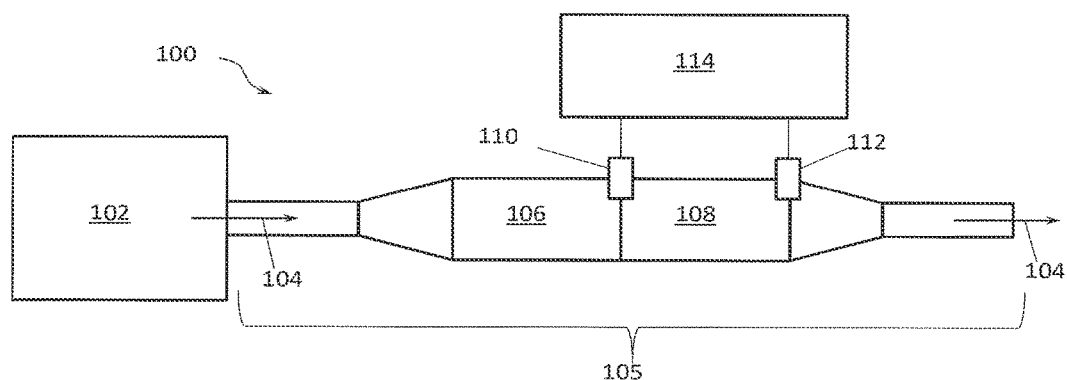
FIG. 1 is a schematic view of an embodiment of the prior art.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

In certain embodiments, a controller is described performing certain operations to detect and report the health of a Diesel Particulate Filter, or other operations. In certain embodiments, the controller forms a portion of a processing subsystem including one or more computing devices having memory, processing, and communication hardware. The controller may be a single device or a distributed device, and the functions of the controller may be performed by hardware or software.

Certain operations described herein include operations to interpret one or more parameters. Interpreting, as utilized herein, includes receiving values by any method known in the art, including at least receiving values from a datalink or network communication, receiving an electronic signal (e.g., a voltage, frequency, current, or a Pulse-Width Modulation ("PWM") signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value.

An internal combustion engine, such as a diesel fueled internal combustion engine, produces an exhaust stream that typically at least contains some particulates, also known as particulate matter ("PM"), and non-methane hydrocarbons ("NMHC"). For a diesel engine, the exhaust stream may be directed through a diesel oxidation catalyst ("DOC"), or any other type of catalyst. The exhaust stream may then be directed through a catalyzed diesel particulate filter ("DPF"), or any other type of filter, where conversion of NMHC into carbon dioxide and water takes place. As the DPF is used in operation and ages, it becomes inert and its efficiency for converting NMHC lessens. Eventually, through enough use, the NMHC conversion efficiency of the DPF becomes insufficient.

To diagnose the NMHC conversion efficiency of a DPF, the outlet temperature of the exhaust stream exiting the DPF can be compared to the inlet temperature of the exhaust stream entering the DPF during an active regeneration of the DPF. If the DPF is catalyzed, then the hydrocarbons should be oxidized by the catalyzed DPF. This oxidation process is an exothermic reaction that generates heat. Thus, the outlet temperature of the exhaust stream should be greater than its inlet temperature.

Typically such heat generation is small (on the order of 5° C.-20° C.) and hard to detect when heat loss to the surrounding environment is significant. Furthermore, the measurement of this heat generation is impacted by the repeatability and accuracy of the temperature sensors, which can be about +/−5° C. In addition, the heat generation can be hard to detect during transient operations of the engine.

With reference to FIG. 1, an example embodiment of a generalized architecture of an internal combustion engine exhaust after-treatment system 100 is shown. An internal combustion engine 102 is provided having an exhaust stream 104 that is directed through an exhaust treatment system 105. The internal combustion engine 102 may be a diesel or gasoline fueled engine, or any other internal combustion engine fueled by combustible fuels. For the purposes of this example, it will be assumed that the internal combustion engine 102 is a diesel engine.

The exhaust after-treatment system 105 is fluidly coupled to the engine 102 and is provided with an oxidation catalyst 106, which may be a diesel oxidation catalyst (DOC) 106 or any other type of catalyst, that is fluidly coupled to the engine 102, and a particulate filter 108, which may be a catalyzed DPF 108 or any other type of filter, downstream of and fluidly coupled to the DOC 106. The DPF 108 is provided with a first temperature sensor 110 at an inlet of the DPF 108 and a second temperature sensor 112 at an outlet of the DPF 108. The temperature sensors 110, 112 may be of any known kind or type, such as thermocouples, resistance temperature sensors, or thermistors. The temperature sensors 110, 112 may be operatively coupled to a controller 114 for monitoring the temperature sensors 110, 112.

The exhaust stream 104, at least containing PM and NMHC, is directed through the DOC 106 and the DPF 108. The efficiency of the DPF in oxidizing hydrocarbons may be measured as a function of the inlet and outlet temperatures of the DPF by the following equation:

$$S_1 = T_{outlet} - T_{inlet} \qquad \text{(eq. 1)}$$

Figure 3:
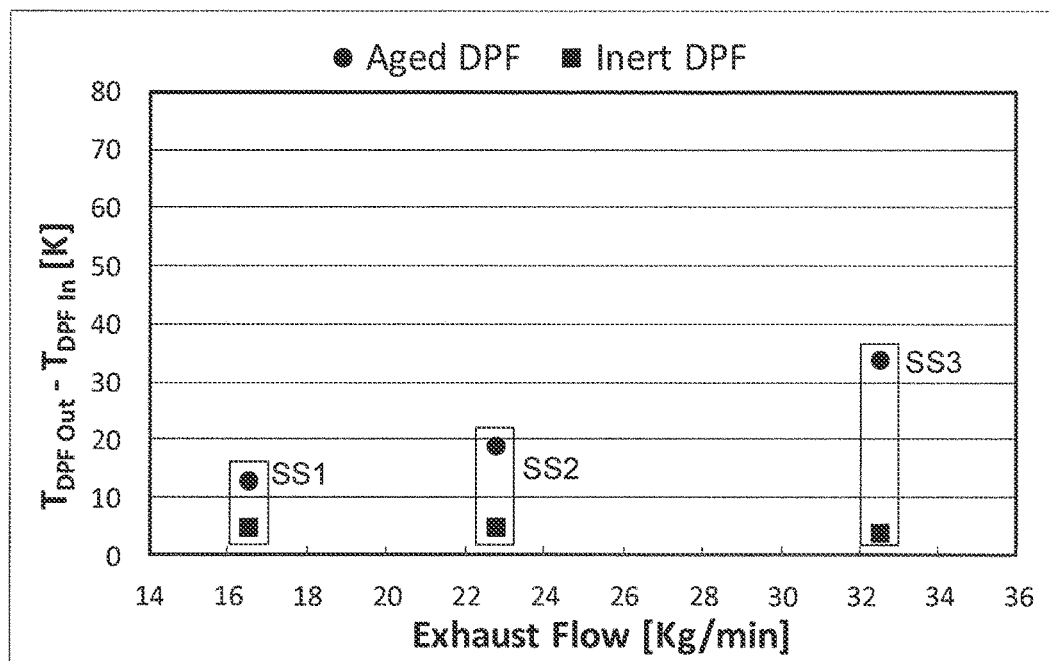
FIG. 3 is a chart showing the diagnostic signal of an inert DPF as compared to an aged DPF using techniques of the prior art.

This signal $S_1$ is plotted in FIG. 3 in terms of degree Kelvin at three different steady states of operation SS1, SS2, SS3 in terms of kg/min of exhaust flow through the exhaust treatment system 105. At each steady state of operation SS1, SS2, SS3, a typical value is given for an aged catalyzed DPF as well as an inert DPF as determined by lab testing. As shown, at a relatively low exhaust flow at SS1, the temperature difference indicated by $S_1$ between an aged catalyzed DPF and an inert DPF is relatively small. Considering the potential loss of heat to the environment and the repeatability problems of typical temperature sensors, it can be difficult to detect when the NMHC conversion efficiency of a DPF is no longer sufficient.

Figure 2:
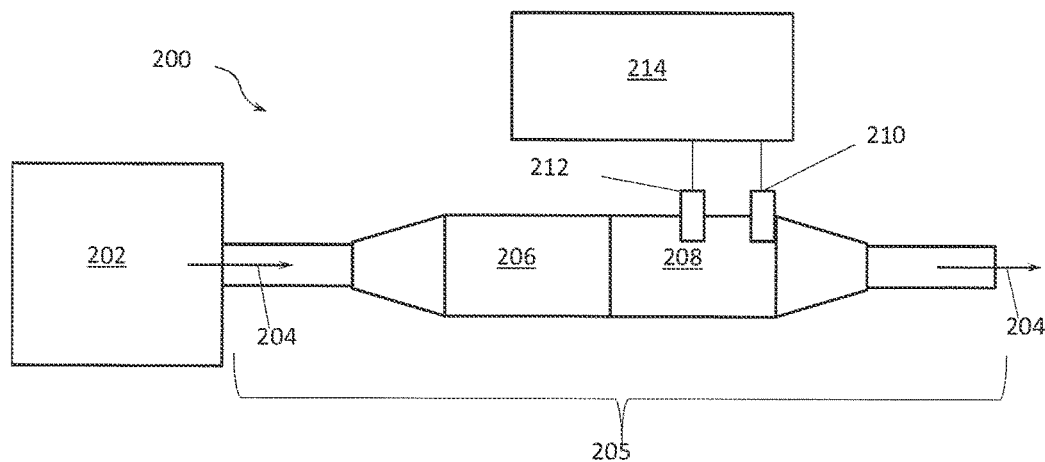
FIG. 2 is a schematic view of an embodiment of the present application.

With reference to FIG. 2, an example embodiment of a generalized architecture of an internal combustion engine exhaust after-treatment system 200 is shown. An internal combustion engine 202 is provided having an exhaust stream 204 that is directed through an exhaust treatment system 205. The internal combustion engine 202 may be a diesel or gasoline fueled engine, or any other internal combustion engine fueled by combustible fuels. For the purposes of this example, it will be assumed that the internal combustion engine 202 is a diesel engine.

The exhaust after-treatment system 205 is fluidly coupled to the engine 202 and is provided with an oxidation catalyst 206, which may a DOC 206 or any other type of catalyst, that is fluidly coupled to the engine 202, and a particulate filter 208, which may be a catalyzed DPF 208 or any other type of filter, downstream of and fluidly coupled to the DOC 206. The DOC 206 may be undersized for complete oxidation of the exhaust stream 204 at a normal engine operating point. As used herein, a "normal engine operating point" is one where emissions regulations are applicable. In such a scenario where the DOC 206 is undersized, the DPF 208 is then utilized to complete the oxidation process of the exhaust stream. Thus, it is of value to know the health of the DPF 208.

The DPF 208 is provided with a first temperature sensor 210 at an outlet of the DPF 208 and a second temperature sensor 212 at a midbed of the DPF 208. The temperature sensors 210, 212 may be of any known kind or type, such as thermocouples, resistance temperature sensors, or thermistors. Furthermore, temperature sensor 210 need not necessarily be at the DPF outlet, and can be any temperature sensor or virtual sensor that provides a reference temperature with which to compare the midbed temperature. The temperature sensors 210, 212 may be operatively coupled to a controller 214 for receiving a signal from, interpreting the signals from, and monitoring the temperature sensors 210, 212; interpreting a health value of the DPF 208 from the interpreted signals from the temperature sensors 210, 212; and producing an output signal relating to the health value of the DPF 208. The signals may be of any electronic signal known in the art, such as, for example, a voltage, frequency, current, or PWM signal.

The exhaust stream 204, at least containing PM and NMHC, is directed through the DOC 206 and the DPF 208. The efficiency of the DPF in oxidizing hydrocarbons may be measured as a function of the outlet and midbed temperatures of the DPF by the following equation:

$$S_2 = T_{outlet} - T_{midbed} \qquad \text{(eq. 2)}$$

Figure 4:
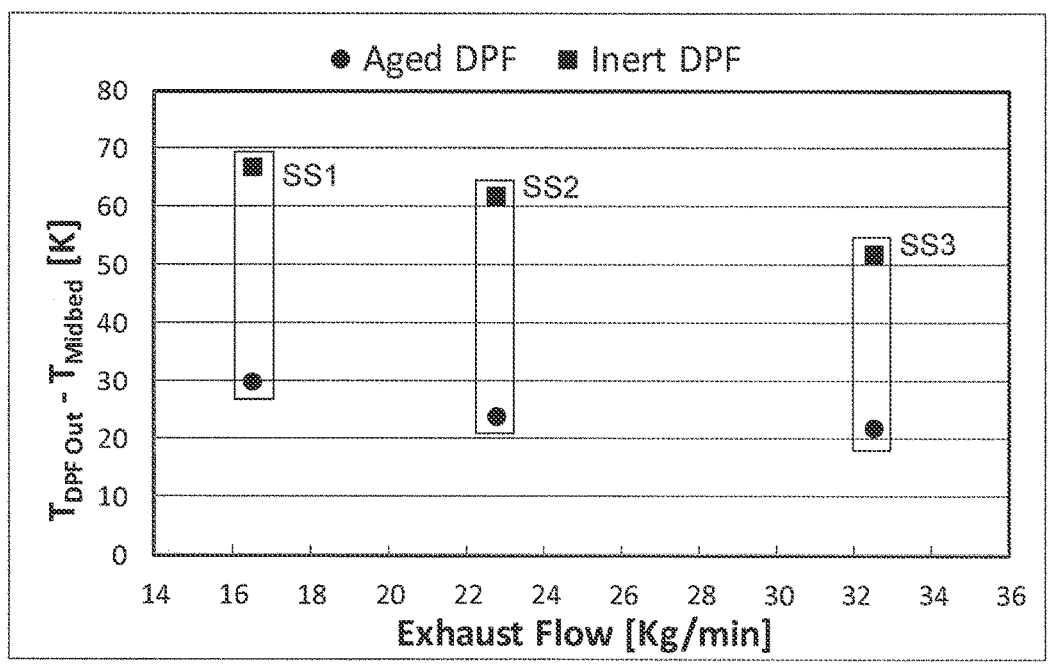
FIG. 4 is a chart showing the diagnostic signal of an inert DPF as compared to an aged DPF using embodiments of the present application.

This signal $S_2$ is plotted in FIG. 4 in terms of Kelvin at three different steady states of operation SS1, SS2, SS3 in terms of kg/min of exhaust flow through the exhaust treatment system 205. At each steady state of operation SS1, SS2, SS3, a typical value can be determined for an aged catalyzed DPF as well as an inert DPF as determined by lab testing.

Due to flow distribution in the DPF 208 in the outermost channels of the DPF (the ones that are closest to the can of the DPF 208), the heat transfer at the outermost channels is dominated by conduction from the neighboring channels inside the DPF, and by the conduction to the can of the DPF 208. For a catalyzed DPF 208, during an active regeneration, the exothermic reaction would get conducted to the outermost channels of the DPF 208. Thus, the exothermic reaction would increase the temperature of the exhaust gas and the midbed substrate temperature of the DPF 208 as compared to the outlet of the DPF.

In case of inert DPF 208, the outer most channels of the DPF 208 will have less heat conducted to them. Thus, the midbed temperature would be much less than the case of the midbed temperature of a catalyzed DPF.

Comparing the first signal $S_1$, shown in FIG. 3, and the second signal $S_2$, shown in FIG. 4, it is readily apparent that the second signal $S_2$ generates a much larger signal than the first signal $S_1$ does when detecting the difference between an aged DPF and an inert DPF. Therefore, using a midbed temperature sensor 212 to determine a temperature difference across a DPF is more desirable to determine if a DPF is inert than it is to use a temperature difference across the entire DPF.

Figure 5:
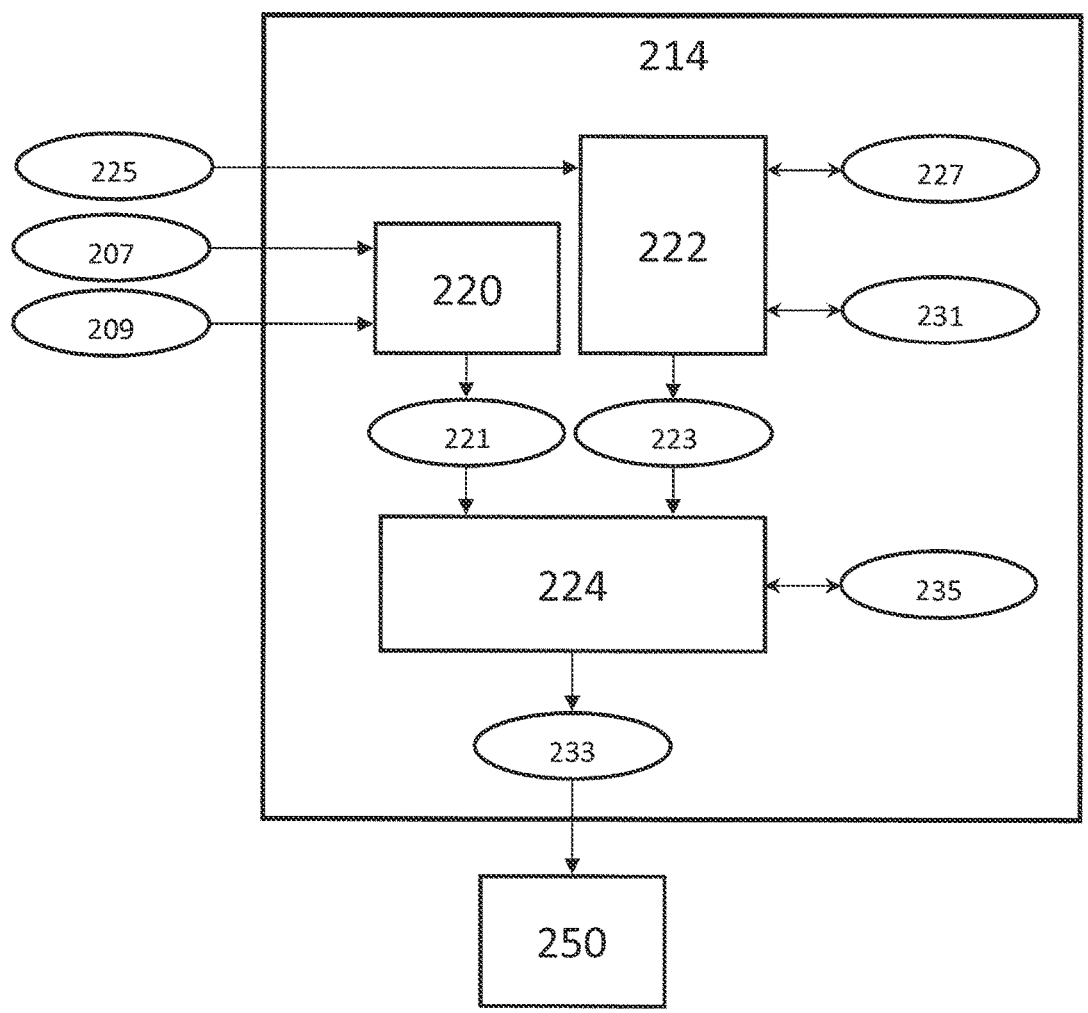
FIG. 5 is a schematic diagram of a processing system for diagnosing the health of a particulate filter.

Referring now to FIG. 5, a schematic diagram of an example processing system for diagnosing the health of a particulate filter is provided. The system is provided as a controller 214 having a temperature sensing module 220, a particulate filter threshold module 222, and a particulate filter diagnostic module 224.

The temperature sensing module 220 receives a temperature signal value 207, 209 from a temperature sensor 210, 212, respectively, as generally disclosed herein. The temperature signal value 207, 209 may come in many different forms, such as, for example, a voltage, a current, or a resistance value. The temperature sensing module 220 interprets these values 207, 209 and determines a temperature comparison value 221, which may be the difference between the two interpreted temperature values.

The particulate filter failure threshold module 222 determines a particulate failure threshold value 223. The particulate filter failure threshold value 223 may be a value that is stored on the controller or module. The particulate filter failure threshold value 223 may be stored in a lookup table that returns a particular temperature difference threshold for any given operating point. The particulate filter failure threshold module 222 determines this by determining the engine operating condition 225, interpreting an aged catalyzed filter value 227, and a failed catalyzed filter value 231. The engine operating condition 225 may be, for example, the engine speed, the exhaust flow rate, whether or not emissions laws apply, whether or not the DPF is in active regeneration, or any combination thereof. The aged catalyzed filter value 227 may be a table, map, chart, value, or range of values indicative of an expected or threshold value for Signal $S_2$ over a range of ages for the DPF at various engine operating conditions. The failed catalyzed filter value 231 may be table, map, chart, value, or range of values for the Signal $S_2$ indicative of an inert DPF, which may be a DPF that is full of sulphur, overheated, lab failed, or field failed and tested, or any other condition indicating an inert DPF.

The particulate filter diagnostic module 224 interprets the temperature comparison value 221 and the particulate failure threshold value 223 and determines a particulate filter health value 233. This may be determined via a lookup table 235 that may be stored on the controller 214, or determined by comparing the Signal $S_2$ to a failed catalyzed filter value 231, and/or by comparing Signal $S_2$ to aged catalyzed filter value 227. The particulate diagnostic module 224 may then send the particulate filter health value 233 to an output device 250, which may include any one or more of the following operations; storing the particulate filter health value as a computer readable medium and non-transitory retrievable value; providing the particulate filter health value to a data link, such as, for example, CAN networks, public or private J1939 standards, computerized data link, or other means known in the art; providing the particulate filter health value by lighting a lamp; providing the particulate filter health value by setting a fault code; or providing the particulate filter health value by generating an electrical output signal; just to name a few operations.

A first aspect of the present application provides a system having an internal combustion engine having an exhaust stream. A particulate filter is disposed downstream of and fluidly coupled to the engine, and has a filter first end and a filter second end downstream of the filter first end. A first temperature sensor is operatively coupled to the exhaust stream and disposed at the second end, or a temperature sensor or virtual sensor is otherwise associated with the particulate filter, and provides a first temperature value. A second temperature sensor is operatively coupled to the exhaust stream and disposed between the filter first end and the filter second end, and provides a second temperature value. A controller is provided with a temperature sensor processing module structured to interpret the first temperature value and the second temperature value. The controller is also provided with a particulate filter failure threshold module structured to interpret a particulate filter failure threshold value; and a particulate filter diagnostic module structured to determine a particulate filter health value in response to the first temperature value, the second temperature, and the particulate filter failure threshold value, and to provide the particulate filter health value to an output device.

A first refinement of the system provides the first temperature sensor and the second temperature sensor as thermocouples.

Another refinement of the system provides an oxidation catalyst fluidly coupled to the internal combustion engine and disposed upstream of the particulate filter. The oxidation catalyst being undersized for complete oxidation of the exhaust stream at at least one normal engine operating point.

Yet another refinement of the system provides the particulate filter as catalyzed.

Another refinement of the system provides the particulate filter failure threshold module as being further structured to perform at least one of the following operations: determine an operating condition of the internal combustion engine; interpret an aged catalyzed filter value; interpret an inert filter value; and interpret a failed catalyzed filter value.

Still another refinement of the system provides the particulate filter diagnostic module as being further structured to provide the particulate filter health value to an output device by at least one of the following operations: storing the particulate filter health value as a computer readable medium and non-transitory retrievable value; providing the particulate filter health value to a data link; providing the particulate filter health value by lighting a lamp; providing the particulate filter health value by setting a fault code; and providing the particulate filter health value by generating an electrical output signal.

Another refinement of the system provides the temperature sensor processing module as being further structured to determine the particulate filter health value in response to comparing the first temperature value to the second temperature value.

Yet another refinement of the system provides the temperature sensor processing module as being further structured to determine the particulate filter health value in response a lookup table stored on the controller.

Another aspect of the present application provides an apparatus having a temperature sensor processing module structured to interpret a first temperature value and a second temperature value, and to determine a temperature comparison value by comparing the first temperature value to the second temperature value. A particulate filter failure threshold module is also provided and is structured to interpret a particulate filter failure threshold value. A particulate filter diagnostic module is also provided and is structured to determine a particulate filter health value in response to the temperature comparison value and the particulate filter failure threshold value, and to provide the particulate filter health value to an output device.

A refinement of the apparatus provides the particulate filter failure threshold module as being further structured to perform at least one of the following operations: determine an operating condition of the internal combustion engine; interpret an aged catalyzed filter value; interpret an inert filter value; and interpret a failed catalyzed filter value.

Another refinement of the apparatus provides the first temperature value as a midbed temperature value of a particulate filter of an internal combustion engine, and the second temperature value as an outlet temperature value of the particulate filter.

Yet another refinement of the apparatus provides the temperature sensor processing module as being further structured to determine the particulate filter health value in response to comparing the first temperature value to the second temperature value.

Another refinement of the apparatus provides the particulate filter failure threshold module as being further structured to determine the particulate filter health value in response a lookup table stored on the controller.

Yet another refinement of the apparatus provides the particulate filter diagnostic module as being further structured to provide the particulate filter health value to an output device by at least one of the following operations: storing the particulate filter health value as a non-transitory retrievable value; providing the particulate filter health value to a data link; providing the particulate filter health value by lighting a lamp; providing the particulate filter health value by setting a fault code; and providing the particulate filter health value by generating an electrical output signal.

Yet another aspect of the present application includes a method that: provides an internal combustion engine with an exhaust stream and a particulate filter fluidly coupled thereto; interprets a first temperature signal and a second temperature signal to determine a first temperature value and a second temperature value; determines a temperature comparison value by comparing the first temperature value to the second temperature value; interprets a particulate filter failure threshold value; determines a particulate filter health value in response to the temperature comparison value and the particulate filter failure threshold value; and provides the particulate filter health value to an output device.

A refinement of the method provides that the first temperature value is determined from a particulate filter midbed temperature, and the second temperature value is determined from the particulate filter outlet.

Another refinement of the method provides that an oxidation catalyst fluidly coupled to the internal combustion engine and disposed upstream of the particulate filter. The oxidation catalyst being undersized for complete oxidation of the exhaust stream at at least one normal engine operating point.

Another refinement of the method further ages the oxidation catalyst.

Another refinement of the method further interprets the filter failure threshold value in response to a lookup table.

Another refinement of the method provides that the particulate filter failure threshold value is further interpreted by at least one of the following operations: determining an operating condition of the internal combustion engine; interpreting an aged catalyzed filter value; interpreting an inert filter value; and interpreting a failed catalyzed filter value.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A system comprising:
   an internal combustion engine having an exhaust stream;
   a particulate filter disposed downstream of and fluidly coupled to said engine, and having a filter first end and a filter second end downstream of said filter first end;
   a first temperature sensor operatively coupled to said exhaust stream and disposed between said filter first end and said filter second end, and provides a first temperature value;
   a controller, wherein the first temperature sensor is operatively coupled to the controller, and wherein the controller structurally comprises:
   a temperature sensor processing module structured to interpret said first temperature value and a reference temperature value;
   a particulate filter failure threshold module structured to determine a particulate filter failure threshold value; and
   a particulate filter diagnostic module structured to determine a particulate filter health value in response to an interpretation by the temperature sensor processing module of said first temperature value and said reference temperature value and further in response to a determination by said particulate filter failure threshold module of said particulate filter failure threshold value.

2. The system of claim 1, where said reference temperature value is provided by a second temperature sensor operatively coupled to said exhaust stream and said controller, and disposed at said filter second end.

3. The system of claim 2, wherein said first temperature sensor and said second temperature sensor are thermocouples.

4. The system of claim 1, further comprising an oxidation catalyst fluidly coupled to said internal combustion engine and disposed upstream of said particulate filter; wherein said oxidation catalyst is undersized for complete oxidation of said exhaust stream at at least one normal engine operating point.

5. The system of claim 1, wherein said particulate filter is catalyzed.

6. The system of claim 1, wherein said particulate filter failure threshold module is further structured to perform at least one of the operations consisting of:
   interpret an aged catalyzed filter value; and
   interpret a failed catalyzed filter value.

7. The system of claim 1, wherein said particulate filter diagnostic module is further structured to provide said particulate filter health value to an output device.

8. The system of claim 1, wherein said temperature sensor processing module is further structured to determine a temperature comparison value in response to comparing said first temperature value to said reference temperature value.

9. The system of claim 8, wherein said particulate filter diagnostic module is further structured to determine said particulate filter health value in response a lookup table stored on said controller.

10. An apparatus comprising:
    an electronic controller operable to receive a first signal from a first temperature sensor associated with a particulate filter and a second signal from a second temperature sensor operatively coupled at a mid-bed location of the particulate filter, wherein the controller structurally includes:
    a temperature sensor processing module structured to interpret a first temperature value from the first temperature sensor and a second temperature value from the second temperature sensor, and to determine a temperature comparison value by comparing said first temperature value to said second temperature value;
    a particulate filter failure threshold module structured to determine a particulate filter failure threshold value; and
    a particulate filter diagnostic module structured to determine a particulate filter health value in response to a determination by said temperature processing module of said temperature comparison value and a determination by said particulate filter failure threshold module of said particulate filter failure threshold value, and to provide said particulate filter health value to an output device.

11. The apparatus of claim 10, wherein said particulate filter failure threshold module is further structured to perform at least one of the operations consisting of:
   determine an operating condition of said internal combustion engine;
   interpret an aged catalyzed filter value; and
   interpret a failed catalyzed filter value.

12. The apparatus of claim 10, wherein said first temperature value is an outlet temperature value of the particulate filter, and said second temperature value is a midbed temperature value of said particulate filter.

13. The apparatus of claim 10, wherein said particulate filter failure threshold module is further structured to determine said particulate filter health value in response a lookup table stored on said controller.

14. The apparatus of claim 13, wherein said particulate filter diagnostic module is further structured to provide said particulate filter health value to an output device by at least one of the operations consisting of:
   storing said particulate filter health value as a non-transitory retrievable value;
   providing said particulate filter health value to a data link;
   providing said particulate filter health value by lighting a lamp:
   providing said particulate filter health value by setting a fault code: and
   providing said particulate filter health value by generating an electrical output signal.

15. A method comprising:
   providing an internal combustion engine with an exhaust stream and a particulate filter fluidly coupled thereto;
   interpreting a first temperature signal and a second temperature signal to deteirnine a first temperature value and a second temperature value;
   determining a temperature comparison value by comparing said first temperature value to said second temperature value;
   interpreting a particulate filter failure threshold value;
   determining a particulate filter health value in response to said temperature comparison value and said particulate filter failure threshold value; and
   providing said particulate filter health value to an output device.

16. The method of claim 15, wherein said first temperature value is determined from a particulate filter outlet temperature, and said second temperature value is determined from said particulate filter midbed temperature.

17. The method of claim 15, further providing an oxidation catalyst fluidly coupled to said internal combustion engine and disposed upstream of said particulate filter; wherein said oxidation catalyst is undersized for complete oxidation of said exhaust stream at at least one normal engine operating point.

18. The method of claim 15, further interpreting said filter failure threshold value in response to a lookup table.

19. The method of claim 15, wherein said particulate filter failure threshold value is further interpreted by at least one of the operations consisting of:
   determining an operating condition of said internal combustion engine;
   interpreting an aged catalyzed filter value; and
   interpreting a failed catalyzed filter value.

* * * * *